United States Patent [19]

Hirose et al.

[11] Patent Number: 4,908,400

[45] Date of Patent: Mar. 13, 1990

[54] PLASTICIZER FOR CHLOROPRENE RUBBER AND PLASTICIZED CHLOROPRENE RUBBER

[75] Inventors: Yasushi Hirose, Urawa; Kenji Iijima, Tokyo; Humihiro Kashima, Kawasaki; Naoyasu Kurita, Urawa; Koji Tajima, Urawa; Hiroshi Hondou, Urawa, all of Japan

[73] Assignees: Du Pont-Showa Denko Co., Ltd.; Adeka Argus Chemical Co., Ltd., both of Tokyo, Japan

[21] Appl. No.: 197,707

[22] Filed: May 23, 1988

[30] Foreign Application Priority Data

Feb. 16, 1987 [JP] Japan .................................. 62-33040

[51] Int. Cl.$^4$ .......................... C08K 5/36; C08L 27/00; C08H 3/00; C08J 3/18
[52] U.S. Cl. .................................... 524/303; 260/399; 524/552; 560/205; 560/224; 560/204
[58] Field of Search ................ 260/399; 560/205, 224, 560/264; 524/303, 552

[56] References Cited

U.S. PATENT DOCUMENTS

| | | | |
|---|---|---|---|
| 2,454,568 | 11/1948 | Pollack | 260/399 |
| 2,541,789 | 2/1951 | Stucker | 260/399 |
| 2,585,448 | 2/1952 | Emerson et al. | 260/399 |
| 2,585,862 | 2/1952 | Smith et al. | 260/399 |
| 2,645,659 | 7/1953 | Morris et al. | 260/399 |
| 3,991,089 | 11/1976 | Schwab et al. | 260/399 |
| 4,335,004 | 6/1982 | Efner | 252/48.6 |

*Primary Examiner*—Herbert J. Lilling
*Attorney, Agent, or Firm*—Frishauf, Holtz, Goodman & Woodward

[57] ABSTRACT

A plasticizer for chloroprene rubber represented by the following general formula (I):

$$R_1(O-R)_m S(R-O)_n R_2 \qquad (I)$$

wherein $R_1$ and $R_2$ independently represent each a saturated or unsaturated aliphatic monoacyl group having 4 to 24 carbon atoms;
R represents an alkylene group having two to four carbon atoms; and
m and n represent each an integer of 1 to 4:
is disclosed.

9 Claims, No Drawings

PLASTICIZER FOR CHLOROPRENE RUBBER AND PLASTICIZED CHLOROPRENE RUBBER

BACKGROUND OF THE INVENTION

1. Field of the Invention

This invention relates to a plasticizer for chloroprene rubber. More particularly, it relates to a plasticizer for chloroprene rubber which comprises an ester of a glycol having a thioether bond with aliphatic monocarboxylic acid(s).

2. Description of the Prior Art

Chloroprene rubber, which is excellent not only in general physical properties of a rubber but also in various properties such as weather resistance, chemical resistance and flame resistance, has been widely applied to, for example, industrial products, building gaskets, high-way joint seals, automotive parts, electrical cables and adhesives.

However the ozone resistance and cold resistance of the chloroprene rubber are unsatisfactory. Thus it has been required to improve these properties thereof.

Similar to other commonly employed rubbers, chloroprene rubber contains plasticizers such as process oil or various ester oils. It is known that ester plasticizers such as unsaturated vegetable oils, butyl oleate or dioctyl sebacate improve the cold resistance of chloroprene rubber.

However none of these plasticizers can exert any satisfactory effect. Therefore there has been proposed to improve the cold resistance of chloroprene rubber by, for example, using an unsaturated carboxylic acid ester of a glycol (cf. Japanese Patent Laid-Open No. 122532/1984) or by employing a dibasic acid ester of an ether alcohol as a plasticizer therefor (cf. Japanese Patent Publication No. 44695/1979).

Although the cold resistance of chloroprene rubber can be improved to a certain extent by using these plasticizers, each of these plasticizers has an insufficient heat resistance, causes a significant physical change upon prolonged heating and shows a considerably poor ozone resistance. Thus these plasticizers are unsatisfactory from the practical viewpoint.

SUMMARY OF THE INVENTION

It is an object of the present invention to provide a plasticizer for chloroprene rubber which is excellent not only in cold resistance and heat resistance but also in ozone resistance and causes little physical changes when chloroprene rubber containing the same is treated at a high temperature for a prolonged period of time.

Under these circumstances, the present inventors have conducted studies in order to develop a plasticizer which is excellent not only in cold resistance and heat resistance but also in ozone resistance. As a result, they have found that a diester of a glycol having a thioether bond with aliphatic monocarboxylic acid(s) as represented by the following general formula (I) is an excellent plasticizer capable of solving all of the above problems, thus completing the present invention:

$$R_1(O-R)_m S(R-O)_n R_2 \qquad (I)$$

wherein $R_1$ and $R_2$ independently represent each a saturated or unsaturated aliphatic monoacyl group having 4 to 24 carbon atoms;

R represents an alkylene group having two to four carbon atoms;

and m and n represent each an integer of 1 to 4.

DETAILED DESCRIPTION OF THE INVENTION

Examples of the alkylene group represented by the R in the compound of the above general formula (I) include ethylene, 1,2-propylene, 1,3-propylene, 1,2-butylene and 1,4-butylene groups. Thus examples of the glycol having a thioether bond include thiodiethanol, thiodipropanol, thiodibutanol, thiodidiethylene glycol, thioditetraethylene glycol and hydroxyethoxyethylthioethanol.

As the aliphatic monocarboxylic acid supplying the saturated or unsaturated aliphatic monoacyl groups represented by the $R_1$ and $R_2$ in the above general formula (I), natural or synthetic aliphatic monocarboxylic acids may be employed. Examples thereof include butyric, caproic, caprylic, 2-ethylhexanoic, capric, isononanoic, lauric, myristic, stearic, isostearic, lauroleic, oleic, elaidic, erucic, linoleic, linoelaidic, eleostearic, myristoleic and linolenic acids as well as aliphatic monocarboxylic acids obtained from natural fats, such as tall oil fatty acids which is a mixture of the abovementioned acids.

One or more of these aliphatic monocarboxylic acids may be employed as the aliphatic monocarboxylic acid(s) in the plasticizer of the present invention. When it is necessary to particularly improve the ozone resistance of chloroprene rubber, it is preferable to use unsaturated aliphatic monocarboxylic acid(s) or a mixture comprising at least 30% by mol of the same. Although unsaturated aliphatic monocarboxylic acid(s) may be exclusively used, the compatibility with the rubber would be somewhat lowered in this case. Thus it is particularly preferable to use a mixture of 30 to 90% by mol of unsaturated aliphatic monocarboxylic acid(s) with 70 to 10% by mol of saturated aliphatic monocarboxylic acid(s) as the aliphatic monocarboxylic acid(s).

Accordingly examples of the plasticizer to be used in the present invention include thiodiethanol dioctoate, thiodiethanol dioleate, thiodiethanol tall oil fatty acid diesters, thiodiethanol di(oleate/octoate) (1:1 by mol), thiodi(diethylene glycol) dioleate and thiodi(diethylene glycol) di(oleate/octoate) (1:1 by mol).

These plasticizers may be prepared by known esterifying processes. For example, they may be readily obtained by condensation of a glycol having a thioether bond with an aliphatic monocarboxylic acid through elimination of water molecule or transesterification between a glycol and an aliphatic monocarboxylic acid lower alkyl ester.

The following Synthetic Example will show a particular synthesis of a plasticizer to be used in the present invention.

SYNTHETIC EXAMPLE

SYNTHESIS OF THIODIETHANOL di(oleate/octoate) (1:1 by mol)

268.4 g (2.2 mol) of thiodiethanol, 380.2 g (2.64 mol) of 2-ethylhexanoic acid, 620.4 g (2.2 mol) of oleic acid, 12.7 g of active carbon and 1.27 g of tetraisopropyl titanate were stirred together under a nitrogen stream at 220° C. for eight hours while removing generated water. After removing excessive 2-ethylhexanoic acid under reduced pressure, the product was filtered through Celite. Thus a product in the form of a brown liquid having an acid value of 0.58, a hydroxyl value of 0.9 and a viscosity of 38 cp was obtained.

The amount of the plasticizer of the present invention is not particularly restricted but may be determined depending on the purpose. In general, approximately 2 to 50 parts by weight, preferably 5 to 40 parts by weight of the plasticizer is employed per 100 parts by weight of chloroprene rubber.

The plasticizer of the present invention may be used together with other known plasticizer(s). In this case, the total amount of the employed plasticizers may be generally adjusted within the range as defined above.

The plasticizer of the present invention may be readily blended with chloroprene rubber by a conventional rubber kneading method by using, for example, an open roll, a Banbury mixer or a kneader blender. In this blending step, other additives conventionally employed in the art, for example, vulcanizer, vulcanizing accelerator, filler, aging inhibitor, processing aid or pigment may be added thereto.

To further illustrate the present invention, and not by way of limitation, the following Examples will be given.

The cold resistance (brittle temperature) of each test piece was determined according to JIS K 6301.

Each test piece was elongated by 0 to 30% in a testing machine at 40° C. and an ozone concentration of 0.5 ppm at a rate of 60 times per minute to thereby examine the dynamic ozone resistance thereof. The ozone resistance was determined by observing the cracking on the surface of the test piece according to the standards of the Item 16 of JIS K 6301. In the following Table, N represents no cracking while the number of cracks increases in the order of A, B and C and the size thereof increases in the order of 1 to 5.

The heat resistance of each test pieces was evaluated from the weight loss, change in hardness (JIS A hardness) and residual elongation thereof after heating the same at 120° C. for 168 hours and 300 hours.

Table 1 shows the results.

TABLE 1

| No. | Plasticizer | Brittle temp. (°C.) | Ozone resistance after 48 hr | 96 hr | 168 hr | After heating for 120 hr wt. loss | hardness change | resid. elong. | After heating for 300 hr wt. loss | hardness change | resid. elong. |
|---|---|---|---|---|---|---|---|---|---|---|---|
| Comp. Ex. 1-1 | butyl oleate | −48 | A-2 | B-3 | C-3 | 6.5% | +27 | 24% | 8.3% | +28 | 23% |
| 1-2 | 1,6-hexanediol dioleate | −51 | A-2 | B-2 | C-3 | 2.2 | +22 | 56 | 4.0 | +25 | 52 |
| 1-3 | butyldiglycol adipate | −50 | A-3 | B-4 | C-4 | 4.7 | +28 | 33 | 6.5 | +29 | 28 |
| Ex. 1-1 | thiodiethanol dioctoate | −52 | NC | A-1 | B-2 | 1.6 | +14 | 73 | 2.8 | +18 | 68 |
| 1-2 | thiodiethanol dioleate | −52 | NC | NC | A-1 | 0.1 | +7 | 88 | 1.1 | +14 | 77 |
| 1-3 | thiodiethanol (oleate/octoate) (1:1) | −54 | NC | NC | B-1 | 1.2 | +9 | 81 | 2.1 | +15 | 75 |
| 1-4 | thiodiethanol tall oil fatty acid diester | −53 | NC | NC | A-1 | 0.1 | +6 | 89 | 1.0 | +13 | 77 |
| 1-5 | thiodiethylene glycol (oleate/octoate) (1:1) | −53 | NC | NC | A-1 | 0.9 | +7 | 83 | 1.8 | +15 | 76 |
| 1-6 | thiodiethanol (oleate/octoate) (1:1) 10 pts. propylene glycol (oleate/octoate (1:1) 10 pts. | −54 | NC | NC | B-1 | 1.5 | +10 | 77 | 2.6 | +17 | 70 |
| 1-7 | thiodiethanol (tall oil fatty acid/2-ethylhexanoic acid) esters (1:1) | −54 | NC | NC | A-1 | 0.8 | +7 | 88 | 1.3 | +12 | 79 |

EXAMPLE 1

| Composition | part by weight |
|---|---|
| chloroprene rubber (Neoprene W. mfd. by Du Pont-Showa Denko) | 100 |
| SRF carbon | 50 |
| magnesium oxide | 4 |
| zinc oxide | 5 |
| stearic acid | 1 |
| mixed dialkyl-p-phenylenediamine | 2 |
| 2-mercaptoimidazoline | 1 |
| tetramethylthiuram disulfide | 0.5 |
| plasticizer | 20 |

The above components were mixed together in an open roll and press-vulcanized at 150° C. for 30 minutes to thereby give a test piece.

EXAMPLE 2

| Composition | part by weight |
|---|---|
| chloroprene rubber (Neoprene WRT mfd. by Du Pont-Showa Denko) | 100 |
| FEF carbon | 60 |
| magnesium oxide | 4 |
| zinc oxide | 5 |
| stearic acid | 0.5 |
| 2-mercaptoimidazoline | 0.5 |
| plasticizer | 30 |

Test pieces were prepared from the above composition in the same manner as the one described in Example 1.

The weight loss, residual elongation, change in hardness and brittle temperature of each test piece were determined in the same manners as those described in Example 1.

Table 2 shows the result.

TABLE 2

| No. | Plasticizer | Weight loss (%) based on hardened matter | Weight loss (%) based on plasticizer | Resid. elong. | Hardness change | Brittle temp. (°C.) before heating | Brittle temp. (°C.) after heating |
| --- | --- | --- | --- | --- | --- | --- | --- |
| Comp. Ex. 2-1 | butyl oleate | 9.4 | 63 | 27% | +25 | −52 | −32 |
| 2-2 | 1,6-hexanediol dioleate | 2.9 | 19 | 58 | +20 | −54 | −44 |
| 2-3 | butyldiglycol adipate | 6.2 | 41 | 36 | +27 | −51 | −37 |
| Ex. 2-1 | thiodiethanol dioctoate | 2.0 | 13 | 73 | +12 | −55 | −50 |
| 2-2 | thiodiethanol dioleate | 0.1 | 1 | 87 | +6 | −56 | −52 |
| 2-3 | thiodiethanol (oleate/octoate) (1:1) | 1.1 | 7 | 82 | +8 | −58 | −55 |
| 2-4 | thiodiethanol tall oil fatty acid diester | 0.2 | 1 | 89 | +6 | −57 | −52 |
| 2-5 | thiodiethylene glycol (oleate/octoate) (1:1) | 0.8 | 5 | 84 | +7 | −56 | −51 |
| 2-6 | thiodiethanol (oleate/octoate) (1:1) 15 pts. propylene glycol (oleate/octoate) (1:1) 15 pts. | 1.7 | 12 | 76 | +11 | −58 | −52 |
| 2-7 | thiodiethanol (tall oil fatty acid/ 2-ethylhexanoic acid) esters (1:1) | 0.6 | 4 | 87 | +6 | −58 | −55 |

The plasticizer of the present invention not only significantly improves the cold resistance and ozone resistance of chloroprene rubber but also has an excellent heat resistance and thus causes little physical changes when the chloroprene rubber containing the same is treated at a high temperature for a prolonged period of time.

What is claimed is:

1. A plasticizer for chloroprene rubber comprising a diester of a glycol having a thioether bond with aliphatic monocarboxylic acid(s) represented by the following formula (I):

$$R_1(O-R)_mS(R-O)_nR_2 \qquad (I)$$

wherein $R_1$ is an unsaturated aliphatic monoacyl group having 4 to 24 carbon atoms;

$R_2$ is a saturated or unsaturated aliphatic monoacyl group having 4 to 24 carbon atoms;

R represents an alkylene group having two to four carbon atoms; and m and n each represent an integer of 1 to 4.

2. A plasticizer as set forth in claim 1, which is thiodiethanol dioleate.

3. A plasticizer as set forth in claim 1, which is thiodiethanol (oleate/octoate) (1:1 by mol).

4. A plasticized chloroprene rubber comprising chloroprene rubber and a plasticizing amount of the plasticizer of claim 1.

5. The plasticized chloroprene rubber of claim 4 wherein said plasticizer is in an amount from 2 to 50 parts by weight per 100 parts by weight of chloroprene rubber.

6. The plasticized chloroprene rubber of claim 4 wherein said plasticizer is in an amount from 5 to 40 parts by weight per 100 parts by weight of chloroprene rubber.

7. The plasticized chloroprene rubber of claim 6 wherein said diester of a glycol is thiodiethanol dioleate.

8. The plasticized chloroprene rubber of claim 6 wherein said diester of a glycol is thiodiethanol (oleate/octoate) (1:1 by mol).

9. The plasticizer chloroprene rubber of claim 6 wherein said saturated or unsaturated aliphatic monoacyl group is a mixture of saturated and unsaturated aliphatic monoacyl groups with 30 to 90 mol % of said groups being unsaturated groups.

* * * * *